Oct. 22, 1940.  M. JACOBS  2,219,162
PIPE COUPLING
Filed Aug. 21, 1939
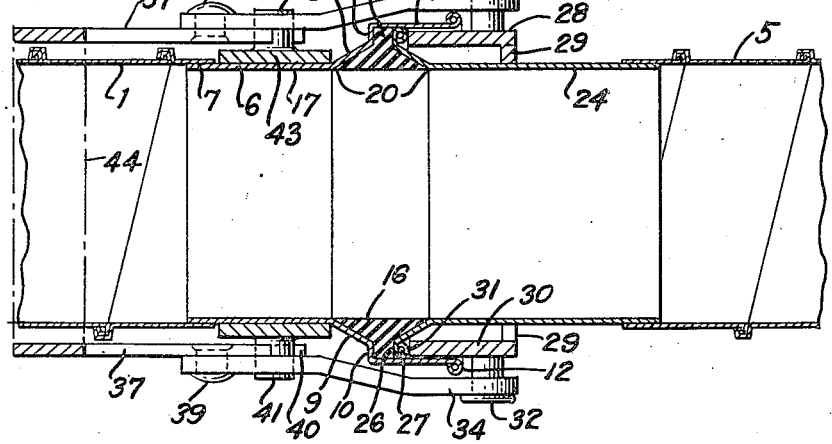
INVENTOR.
MAYHELT JACOBS
BY A. Dunham Owen
ATTORNEY.

Patented Oct. 22, 1940

2,219,162

UNITED STATES PATENT OFFICE 2,219,162

PIPE COUPLING

Mayhelt Jacobs, San Francisco, Calif., assignor to Pacific Pipe Co., San Francisco, Calif., a corporation of California Application August 21, 1939, Serial No. 291,211

2 Claims. (Cl. 285—172)

My invention relates to pipe couplings and particularly to draw-lock quick couplings which can be connected and disconnected rapidly.

My invention has particular application to use with very light pipes of thin sheet metal which carry water for irrigation through an orchard or garden. Such pipe lines are usually set up, used for awhile in one position and then taken apart and set up to water in another direction. The use of such light metal pipes set up so they can be moved about is advantageous over a permanent installation.

It is desirable for such service that means be provided for securing a tight joint between successive sections of the pipe which may be connected and disconnected with great rapidity and without requiring elaborate tools or other equipment. Also, it is important that the coupling have a resilient rubber gasket arranged to seal the joint between successive sections while at the same time permitting considerable flexibility between those sections, so that irregularities in the contour of the ground and in the direction in which the pipes are laid will not interfere with the seal.

It should be realized that these pipe lines and couplings are used in fields under conditions of rough handling and where there is great likelihood of damage to exposed parts and loss of loose parts. One of the objects of my invention is to provide a coupling device which houses the most fragile part inside one member.

Another object achieved by my invention is to facilitate assembly, because the feature which protects the parts also holds them in loose connected relationship while the sections are being laid out over the ground.

Another object achieved by my invention which facilitates assembly is the provision of a floating clamping means because it is not necessary that both pipes be rotated into a certain position before coupling.

Still another object is to provide for the insertion of the auxiliary outlets such as whirling sprays in the main and auxiliary feeder pipe lines. A further object is to provide a coupling unit which can be applied to pipes without pre-forming the ends thereof.

The invention possesses other objects and features of advantage, some of which, with the foregoing, will be set forth in the following description of a preferred form of my invention which is illustrated in the drawing accompanying and forming a part of the specification. It is to be understood that I do not limit myself to the showing made by the drawing and description as I may adapt a variation of the preferred form within the scope of my invention as set forth in the claims.

In the drawing,

Fig. 1 is a side view of my coupling device joining two pipe sections;

Fig. 2 is a top view of my coupling device connecting two pipe sections;

Fig. 3 is a detailed view partially in section showing the construction of my coupling; and Fig. 4 is a schematic view partially in perspective and partially in section of the component parts of my coupling separated axially to show their relation to each other.

Referring now to the figures for a more complete understanding of my invention, I have shown in Fig. 1 two pipe sections joined together. Pipe 1 is fixed to a female coupling member 2, with which male coupling member 4 cooperates. Member 4 is fixed to pipe 5, and the two coupling members 2 and 4 are held together by a lever locking arrangement. Details of the coupling may be seen in Figs. 3 and 4.

Female member 2 comprises a cylindrical body member 6 to which pipe 1 is firmly attached by welding or other convenient methods at 7. Body member 6 is flared outwardly to form a tapered or conical portion 9 on which terminally is formed a radial wall 10. At the outward periphery of radial wall 10 a cylindrical rim portion 11 is formed. Cylindrical portion 11 may be terminated by a beaded or rolled edge 12 for reinforcement. The conical portion 9 and radial wall 10 form internally a seat adapted to receive and hold a resilient sealing member 15.

Sealing member 15 comprises a resilient ring of rubber or other composition having a cylindrical inner surface 16 which is arranged to extend in substantial continuation of the inner surface 17 of coupling body member 6. The cylindrical inner surface 16 of the washer preferably intersects with conical outer washer surfaces 19 to form a thin sharp sealing lip 20 at each end of the member. The conical surfaces 19 centrally intersect a radial rib 21, which has two functions.

One function of the rib 21 is to stiffen the sealing member and to prevent it from warping or twisting in position. Under certain situations a negative pressure may be produced in the pipes with the result that if the rib 21 were not present, the sealing washer might buckle inwardly and out of position, so that when a positive pressure again existed in the pipe, the sealing lips 20 would not be in proper position to be forced into engagement with the conical surfaces 9, and the joints might leak. Another function of the radial rib 21 is to form a direct compressive seal between radial walls 10 and 26 of the coupling members. Another of its functions is to assist in holding the sealing member in the female coupling when the parts are uncoupled. This construction has many advantages in use. For instance, when the pipe is uncoupled and being thrown about in a truck or on the ground, the sealing member is shielded and not so likely to become injured or lost.

The male coupling member 24 is fixed to pipe 5 in a fashion similar to the connection between pipe 1 and coupling member 6. It also has a complementary conical surface 25 and a short radial wall 26. The beaded edge 27 is of just the proper diameter to fit slidably within the cylindrical portion 11 of the female coupling member.

The advantages of this arrangement will be apparent from the fact that when inserted, and before the coupling members are locked, the sections of pipes will remain in connected aligned position while being adjusted over the terrain. Also, the complementary conical portions 9 and 26 will be aligned and ready for closing of the coupling lock.

The locking device employs a floating collar 28 fitted about body member 24, free to rotate thereabout and to slide axially. The collar 28 may consist of radial wall 29, which is centrally apertured to fit loosely about body member 24, and a cylindrical member 30 of diameter such that the free end 31 may engage the rolled or beaded end 27 formed on the male body member. Diametrically opposed studs 32 extend outwardly from the collar 28 and carry links 34, which are free to pivot thereabout. Each link 34 consists of a body member 35 having an elbow 36 at the end opposite the pivot 32 formed at substantially a right angle to body 35. A yoke 37 is pivoted near the end of elbows 36 by means of a pivot pin 39. Yoke portions 40 extend beyond the pin 39 and engage a stud 41 fixed to a collar 43 surrounding the coupling member 6. Collar 43 may be fixed to body member 6 by any convenient means.

The angular relation in levers 34 between the elbows 36 and the body portions 35 is such that when it is desired to connect the two pipe units, the extending yoke portions 40 are brought into contact on their edges 42 with the stud 41. The handle portion 44 of yoke 37 is then pivoted about pin 39, which draws together the male and female clamping members and locks them in place. The locking is accomplished by the well-known snap latch action, wherein the line of force between the centers of the two pivots 39 and 32 is caused to pass beyond the center of stud 41, handle 44 finally resting against pipe 1.

When it is desired to disconnect the joint, the handle 44 is raised pivotally about pin 39.

When the two coupling members are drawn together by the lever action described above, the free end 31 of the collar 28 presses against the rolled edge 27 of male coupling member 24 and compresses it against the radial rib 21, which is backed by the radial wall 10. The resiliency of the radial lip maintains a tight joint between radial walls 10 and 26 and provides a part of the sealing action between the two pipes 1 and 5. In addition, the stresses in the radial rib tend to maintain the alignment of adjacent pipe sections, although permitting these pipes to diverge up to 7° or more. The stresses in the radial rib 21 also assist in keeping the snap latch under proper tension, so that the joint will always be positively locked unless the handle 44 is deliberately raised.

An advantage of having one member of the coupling lock free to rotate comes in connection with joining sections of pipe which are not in direct alignment, such as where a curve is made to avoid a tree or when the pipes are laid over a slight rise in the land. In such cases the workman rotates each section of pipe so that the plane of the fixed pivot studs 41 lies at 90° to the plane of the bend. Then when coupled the floating collar 28 will automatically yield and securely engage the sealing member flange 21.

While a tight seal exists between the radial lip 21 and the radial walls 10 and 26, I do not rely solely upon the sealing action at this point, but intend that an important part of the sealing actually shall take place between the thin sharp flexible lips 20 and the conical portions 9 and 25 formed at the ends of the coupling members 6 and 24. The presence of water under pressure in the pipes tends to strengthen this sealing action by pressing the flexible lips more tightly against the conical pipe ends.

The lever members which I have described may be manufactured of light but strong material, so that they do not add greatly to the weight of the pipe. The same is true of the collars 28 and 43. It is desirable that these weights be kept as low as possible in order that the overall weight of the pipe sections may not slow up the process of setting up or tearing down the irrigation system.

In Fig. 1 I have shown a method by which auxiliary irrigating equipment may be connected into the pipe line at a desired point. A threaded bushing 47 is set into the wall of body member 24, and a pipe 45 carrying a sprinkler head 46, for example, may be fixed thereto. By providing a certain number of these inset bushings, it is possible to tap the irrigation line whenever desired. By means of the floating coupling member, I can adjust the relative position of the bushing 47 for a vertical or side take-off.

While I have described my quick acting coupling as used in connection with irrigation pipes, I do not wish to be limited thereto, for my coupling design is applicable to any situations where it is desired to connect pipes quickly without the aid of tools by a joint which is substantially leak-proof and which can be readily taken down.

I have described the resilient sealing member as being made of rubber, but it will be obvious that various other materials possessing the requisite characteristics of flexibility and resiliency may be substituted therefor. It will also be apparent that the exact proportions and arrangement of parts shown may be changed in any details, or a different type of pipe used, but all such variations are deemed to fall within the skill of one familiar with the art.

What I claim is:

1. A pipe coupling comprising a pair of members, one axially slidable within the other so as to nest therewith, the outer one of said members having an axially extending rim with a generally radial wall extending inwardly therefrom and a tapered wall portion joining said radial wall to the axial bore of the pipe, the nested member having a generally radial wall complementary to the radial wall on said outer member, and a tapered wall portion substantially complementary to the one on said outer member, a resilient sealing ring having tapered sealing lips fitted to said tapered walls and a radial portion clamped between said complementary radial walls, a pressure collar encircling said nested member and axially slidable thereon, said collar having an axial portion extending within the axial rim of the outer coupling member and into contact with the radial wall of said nested member, means secured to the outer coupling member to provide pivot points; links pivoted to said pressure collar, and lever means secured to said links and adapted to engage said pivot points and slide said pressure collar relative to said member to compress said sealing ring therebetween whereby said coupling members are secured together.

2. The combination, in a pipe coupling, of a pair of cylindrical sheet metal body members one of which is provided with an angularly disposed pipe fitting, each of said members being arranged to be fixed at one end thereof to a pipe to be coupled so as to communicate with said fitting, a conically flaring portion formed adjacent the opposite end thereof, a radial wall extending outwardly from said flared portion, a cylindrical segment formed on and extending axially from one of said radial walls, a beaded end reinforcement formed on the other of said radial walls and arranged to engage slidably within said cylindrical segment; a resilient sealing member having a cylindrical inner surface arranged as a continuation of said cylindrical body members, conical outer surfaces intersecting said cylindrical inner surface and arranged to fit snugly against said flared conical body member portions, a radial rib extending to said cylindrical segment and arranged to be held between said radial walls, a collar fixed around one of said body members, studs extending from said collar, a second collar slidably positioned about the other of said body members and arranged for axial engagement with said end reinforcement, a pair of links pivotally connected to opposite sides of said collar, and a yoke pivotally connected to said pair of links; said yoke, links, and studs being arranged to draw said radial walls together and to maintain coupled position by snaplock action.

MAYHELT JACOBS.